J. A. FORSYTH & H. G. ADAMSON.
AUTOMATIC COUPLING FOR MINING CARS.
APPLICATION FILED APR. 1, 1915.

1,201,283.

Patented Oct. 17, 1916.

WITNESS

INVENTORS
J. A. Forsyth
H. G. Adamson
by F. N. Barber
attorney

UNITED STATES PATENT OFFICE.

JOHN A. FORSYTH AND HARRISON G. ADAMSON, OF FREDERICKTOWN, PENNSYLVANIA, ASSIGNORS OF ONE-THIRD TO PETER NEILL, OF FREDERICKTOWN, PENNSYLVANIA.

AUTOMATIC COUPLING FOR MINING-CARS.

1,201,283.  Specification of Letters Patent.  Patented Oct. 17, 1916.

Application filed April 1, 1915. Serial No. 18,473.

*To all whom it may concern:*

Be it known that we, JOHN A. FORSYTH and HARRISON G. ADAMSON, citizens of the United States, residing at Fredericktown, in the county of Washington and State of Pennsylvania, have invented new and useful Improvements in Automatic Couplings for Mining-Cars, of which the following is a specification.

Our invention relates to car-couplers generally, but more particularly to couplers designed for use with mining cars.

The objects of our invention are to provide a simple, cheap, and efficient car-coupling apparatus of the link and pin type, which automatically connects the cars together.

Another object is to provide a coupler without springs or other devices which may readily break or get out of order.

Other objects will appear hereafter.

Figure 1:
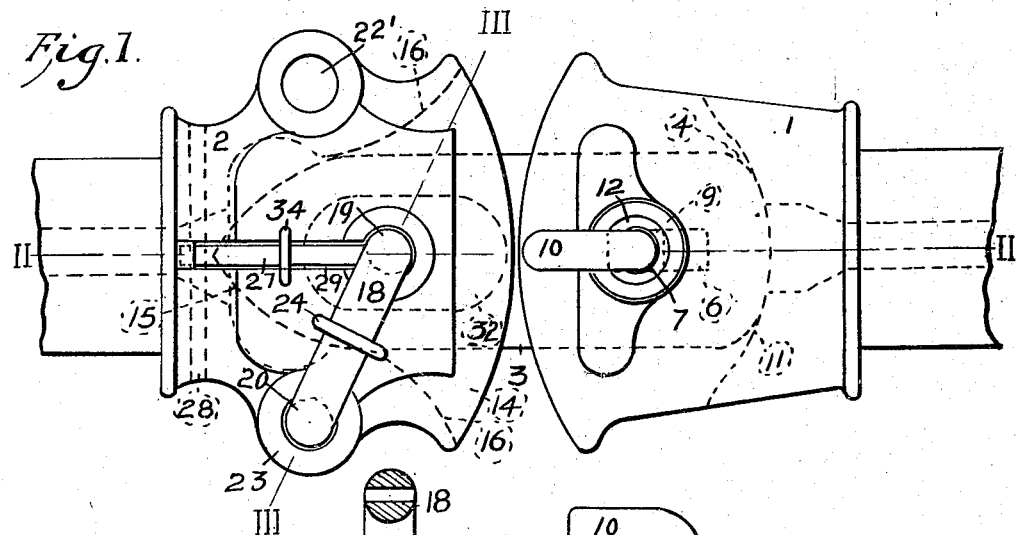
Figure 2:
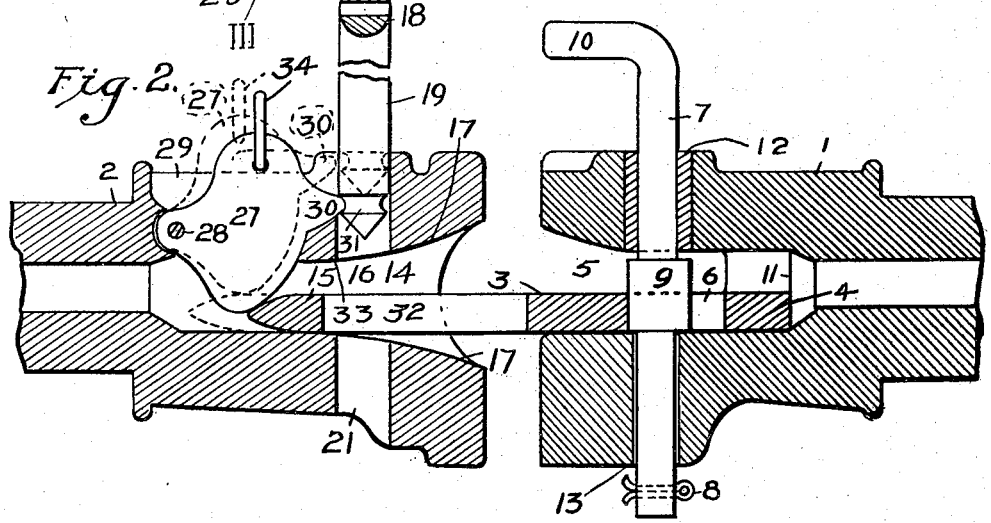
Figure 3:
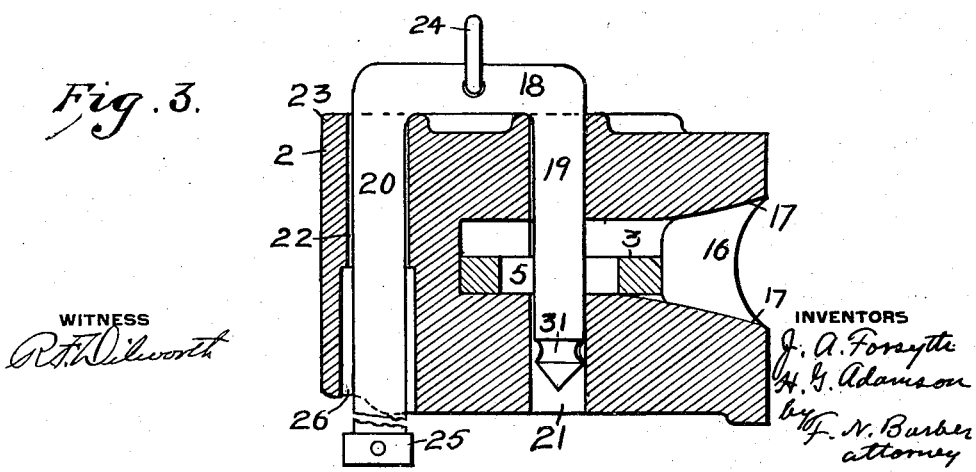

Referring to the accompanying drawing, Figure 1 is a plan view of two draw-heads provided with our improved coupling apparatus; Fig. 2, a central longitudinal vertical section of Fig. 1 on the line II—II; and Fig. 3, a vertical section on the line III—III, Fig. 1.

On the drawing, 1 and 2 represent two opposing draw-heads designed to be coupled together by the link 3 having one end marked 4 in the horizontal open-ended slot 5 in the draw-head 1. The link 3 has the vertical elongated slot 6 with sides parallel with the link. The vertical pin 7 extends down through the draw-head 1 and the slot 6, and is provided with the cotter-pin 8 which extends down through it below the draw-head and prevents the removal of the pin by upward movement thereof. The portion 9 of the pin which extends through the slot 6 is made square in cross-section and has its opposite sides so close to the sides of the slot that, when the pin 7 is turned by its handle 10, the squared portion 9 moves the link 3 laterally. The slot 6 is made of such length that, when the end 4 of the link 3 engages the rear wall 11 of the opening 5, the pin 7 will not sustain any thrust on the link, thereby preventing the pin from becoming damaged. The wall of the draw-head 1 above the opening 5 contains the removable bushing 12 which surrounds the pin 7. This bushing is larger in cross-section than the square portion 9 of the pin so as to permit the insertion of the pin 7, into the draw-head and its removal therefrom. The portion 9 of the pin 7 being larger than the opening 13 for the pin below the said portion 9, holds the pin in the position shown, but other means for sustaining the pin will readily suggest themselves. The draw-head 2 has the central opening 14 to receive the free end 15 of the link 3, this end of the link being beveled on both its lateral surfaces and at both its upper and lower surfaces, these surfaces engaging correspondingly inclined lateral surfaces 16 and upper and lower surfaces 17 in the outer end of the opening 14.

18 represents a U-shaped coupling pin, having the two legs or members 19 and 20 having vertical reciprocation in the openings 21 and 22, respectively, in the draw-head 2, the opening 21 being in the central portion of the draw-head and intersecting the opening 14, and the opening 22 being in the lug 23 at one side of the draw-head. We provide an opening 22' at the opposite side of the draw-head to receive the members 20 in case the opening 22 becomes worn too much or the lug 23 becomes broken.

24 is a loop or link in the top of the coupling-pin 18 to receive the usual chain by which it may be raised to the position shown in Fig. 2. The lower end of the pin member 20 is provided with the removable collar 25 which is reciprocable in the enlargement 26 of the lower end of the opening 22. The collar limits the upward movement of the pin.

27 is a latch pivoted on the horizontal pin 28 and in the slot 29 which is in the upper wall of the draw-head 2 and communicates with the openings 14 and 21. The rear end of the latch rocks on the rear wall of the slot 29 to relieve the pin 28 from strain. The front end of the latch has a finger or projection 30. The latch is of such length that the finger 30 extends for some distance into the opening 21 when the latch is near its horizontal position, as shown in full lines, and that the finger will be withdrawn from the opening 21, when the latch is lifted sufficiently, as shown in dotted line. The finger 30 is arranged to enter the lateral notch 31 in the member 19, when the latter is lifted somewhat above the opening 14. The lower edge of the latch is made cam-shaped or inclined forwardly and upwardly so as to lie in the path of the end 15 of the link 3 when the latter enters the opening 15 and is moved beneath the latch. As the link passes beneath the latch 27 it lifts the same, causing the finger 30, by its location in the notch 31, to lift the coupling-pin 18 until the finger is withdrawn from the said notch, whereupon the member 19 is released and the coupling-pin falls to the position shown on Fig. 3. In falling the member 19 passes through the opening 32 in the forward portion of the link. The opening 32 is made quite large so that the member 19 may pass through it whatever position the link may take with respect to the draw-head 2. When cars are on curves the link 3 is at a considerable of an angle with the draw-head 2, thereby throwing a large part of the coupling-link in the coupler-head to one side of the opening 21. It is necessary to have the opening 32 large enough to receive the member 19 on short curves when the link is so thrown as well as on straight portions of the track, when the link is centrally arranged in the draw-head.

When the coupling-pin 18 is raised until the notch 31 reaches the finger 30, the latter drops into the former and prevents the pin 18 from falling. The latch 27 may be prevented from falling from the position shown by various means. The cross-wall 33 at the lower front corner of the slot 29 may be left for the latch to rest on. The latch may be released by hand by lifting it by means of the ring 34.

The end of the link 3 in the coupler-head 1 is heavier than the other end whereby the link is kept level or nearly so, so that it will engage the inclined walls in the opening 14, the bottom wall of the opening on which the link lies being horizontal.

We claim—

1. In a car-coupler, a coupler-head having a horizontal open-ended opening with a substantially horizontal bottom, and a vertical opening intersecting the horizontal opening, a coupling link having a vertical opening with parallel sides, a coupling-pin in the vertical opening, the coupling-pin having a portion with parallel sides engaging the sides of the opening in the link, and a handle for the coupling-pin whereby the latter and the link may be moved sidewise.

2. In a car-coupler, a coupler head having a horizontal open-ended opening and a vertical opening intersecting the horizontal opening, a coupling link having a vertical longitudinal opening, a coupling pin in the vertical opening in the coupler-head and coupling-link, the opening in the link being of such length as to permit the link to engage the end wall of the said horizontal opening without causing the link to exert any lateral thrust on the coupling-pin, means for rotating the coupling-pin, and means causing the link to be rotated by the coupling pin.

3. In a car-coupler, a coupler-head having an open-ended horizontal opening and a vertical opening intersecting the same, the latter opening being smaller below the horizontal opening than above the same, a coupling link in the said horizontal opening, a coupling-pin in the said vertical opening and an opening in the coupling-link, the coupling-pin being provided with an enlargement of greater size than the vertical opening below the horizontal opening and of smaller size than the vertical opening above the horizontal opening, a bushing on the coupling-pin and in the latter vertical opening, and means for rotating the coupling-pin, the enlargement causing the link to turn therewith.

Signed at Fredericktown, Pa., this 25th day of March, 1915.

JOHN A. FORSYTH.
HARRISON G. ADAMSON.

Copies of this patent may be obtained for five cents each, by addressing the "Commissioner of Patents, Washington, D. C."